(12) United States Patent
Willard et al.

(10) Patent No.: US 7,462,443 B2
(45) Date of Patent: Dec. 9, 2008

(54) LEUCO DYE-CONTAINING COATING COMPOSITIONS

(75) Inventors: Randall Orson Willard, Corvallis, OR (US); Rolf Dessauer, Greenville, DE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 10/655,708

(22) Filed: Sep. 5, 2003

(65) Prior Publication Data

US 2005/0053870 A1    Mar. 10, 2005

(51) Int. Cl.
*G03F 7/00* (2006.01)
(52) U.S. Cl. .................... 430/332; 430/270.1
(58) Field of Classification Search .............. 430/270.1, 430/332
See application file for complete search history.

(56) References Cited

U.S. PATENT DOCUMENTS

| | | |
|---|---|---|
| 1,674,128 A | 6/1928 | Rose |
| 2,579,543 A | 12/1951 | Brode et al. |
| 3,383,212 A | 5/1968 | Maclachlan |
| 3,390,994 A | 7/1968 | Cescon |
| 3,390,995 A | 7/1968 | Manos |
| 3,390,996 A | 7/1968 | Maclachlan |
| 3,423,427 A | 1/1969 | Cescon et al. |
| 3,445,233 A | 5/1969 | Cescon |
| 3,445,234 A | 5/1969 | Cescon |
| 3,449,379 A | 6/1969 | Cescon et al. |
| 3,478,185 A | 11/1969 | Chambers |
| 3,533,797 A | 10/1970 | James |
| 3,547,647 A | 12/1970 | Grubb |
| 3,552,973 A | 1/1971 | Fishman |
| 3,554,753 A | 1/1971 | Cohen |
| 3,563,750 A | 2/1971 | Walker |
| 3,563,751 A | 2/1971 | Cohen |
| 3,579,342 A | 5/1971 | Strilko |
| 3,585,038 A | 6/1971 | Cescon |
| 3,598,592 A | 8/1971 | Cescon |
| 3,615,454 A | 10/1971 | Cescon |
| 3,615,481 A | 10/1971 | Looney |
| 3,658,542 A | 4/1972 | Cyrus |
| 3,658,543 A | 4/1972 | Gerlach, Jr. et al. |
| 3,661,461 A | 5/1972 | Dessauer |
| 3,666,466 A | 5/1972 | Strilko |
| 3,672,933 A | 6/1972 | Lieberman |
| 3,674,534 A | 7/1972 | Connair |
| 3,704,127 A | 11/1972 | Dessauer |

(Continued)

FOREIGN PATENT DOCUMENTS

EP          828182        3/1998

(Continued)

*Primary Examiner*—Amanda C. Walke (57) ABSTRACT

Compositions and systems for labeling substrates, such as optical disks, using leuco dye-containing coating compositions are described. The composition can comprise a color forming composition, an electromagnetic radiation absorber, and a stabilizing agent. The color forming composition can include a leuco dye, a hexaarylbiimidazole activator, and an acid-generating source. The absorber can be admixed with or in thermal contact with the color forming composition. The stabilizing agent can be configured for protecting the leuco dye upon exposure to ambient light, wherein the stabilizing agent comprises a diarylguanidine dye salt. The coating composition can be optimized for development using electromagnetic radiation having a frequency from about 760 nm and 800 nm.

31 Claims, 1 Drawing Sheet

U.S. PATENT DOCUMENTS

| | | |
|---|---|---|
| 3,784,557 A | 1/1974 | Cescon |
| 3,847,608 A | 11/1974 | Dessauer |
| 3,992,450 A | 11/1976 | Neumer |
| 4,009,040 A | 2/1977 | Nebe |
| 4,029,506 A | 6/1977 | Dessauer |
| 4,078,934 A | 3/1978 | Neumer |
| 4,126,466 A | 11/1978 | Roos |
| 4,207,102 A | 6/1980 | Dessauer |
| 4,232,108 A | 11/1980 | Dessauer |
| 4,247,618 A * | 1/1981 | Dessauer et al. ............ 430/342 |
| 4,252,887 A | 2/1981 | Dessauer |
| 4,311,783 A | 1/1982 | Dessauer |
| 4,427,758 A | 1/1984 | Quinn |
| 4,585,722 A * | 4/1986 | Morinaka et al. .......... 430/201 |
| 4,622,286 A | 11/1986 | Sheets |
| 4,962,009 A * | 10/1990 | Washizu et al. ............ 430/138 |
| 5,559,247 A * | 9/1996 | Matsumoto et al. ......... 548/471 |
| 5,703,006 A * | 12/1997 | Mori et al. .................. 503/207 |
| 5,744,280 A * | 4/1998 | Mooney et al. ......... 430/270.1 |
| 5,858,583 A | 1/1999 | Dessauer |
| 5,955,224 A | 9/1999 | Caspar |
| 6,143,480 A * | 11/2000 | Obayashi et al. ............ 430/332 |
| 6,197,723 B1 * | 3/2001 | Gotoh ....................... 503/201 |
| 6,251,571 B1 | 6/2001 | Dessauer et al. |
| 6,291,143 B1 * | 9/2001 | Patel et al. ................. 430/339 |
| 6,316,161 B1 * | 11/2001 | Obayashi et al. ......... 430/280.1 |
| 6,660,446 B2 * | 12/2003 | Shimada et al. .......... 430/270.1 |
| 6,818,363 B2 * | 11/2004 | Fincher et al. ............... 430/11 |
| 6,864,040 B2 * | 3/2005 | Muller et al. ............ 430/287.1 |
| 6,890,614 B2 * | 5/2005 | Gore et al. ................. 428/64.1 |

FOREIGN PATENT DOCUMENTS

EP  0 889 363 A1  1/1999

* cited by examiner

LEUCO DYE-CONTAINING COATING COMPOSITIONS

FIELD OF THE INVENTION

The present invention relates generally to applications of leuco dyes. More particularly, the present invention relates to leuco dye-containing compositions for use in producing images on optical disk substrates.

BACKGROUND OF THE INVENTION

Optical disks represent a significant percentage of the market for data storage of software as well as of photographic, video, and/or audio data. Typically, optical disks have data patterns embedded thereon that can be read from one side of the disk, and a graphic display printed on the other side of the disk. Various optical disk formats are currently available such as CD, CD-ROM, CD-R, CD-RW, DVD, DVD-R, DVD-RW, DVD+R, and DVD+RW. Other optical disk formats are also available.

In order to identify the contents of the optical disk, printed patterns or graphic display information can be provided on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions or preprinted labels which may be affixed to the disk, but which can also adversely affect the disk performance upon spinning at high speeds.

Recently, a variety of leuco dye-containing compositions have been investigated for use on optical disks. However, many of these compositions are insufficiently stable under ambient light conditions for practical use.

SUMMARY OF THE INVENTION

In one aspect of the present invention, a coating composition is prepared which includes: a color forming composition comprising a leuco dye, a hexaarylbiimidazole activator, and an acid-generating source; an electromagnetic radiation absorber admixed with or in thermal contact with the color forming composition; and a stabilizing agent for protecting the leuco dye upon exposure to ambient light. The stabilizing agent can include a diarylguanidine dye salt such as a yellow diaryl-phenylguanidine salt. The color forming composition can be optimized for development using infrared radiation having a frequency of between about 760 nm and 800 nm.

Another aspect of the present invention includes a system for labeling a substrate, comprising an image data source; an optical disk substrate having a spin-coatable composition coated thereon; and an infrared radiation source operatively connected to the image data source which directs electromagnetic radiation having a frequency of about 780 nm to the spin-coatable composition. The spin-coatable composition can comprise a color forming composition including a leuco dye, a hexaarylbiimidazole activator, and an acid-generating source. Additionally, the spin-coatable composition can include an electromagnetic radiation absorber admixed with or in thermal contact with the color forming composition. Further, the spin-coatable composition can include a stabilizing agent for protecting the leuco dye upon exposure to ambient light, such as after development of the leuco dye. The stabilizing agent can be a diarylguanidine salt.

Additional features and advantages of the invention will be apparent from the detailed description which follows, taken in conjunction with the accompanying drawings, which together illustrate, by way of example, features of the invention.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a leuco dye" includes reference to one or more of such materials.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, CD, CD-ROM, CD-R, CD-RW, and the like. Other like formats may also be included, such as similar formats and formats to be developed in the future.

As used herein, "graphic display" can include any visible character or image found on an optical disk. Typically, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like.

The term "color forming composition" typically includes a leuco dye, an activator, and an acid-generating source. These three components can work together, upon exposure to heat, to alter or provide color to the leuco dye.

As used herein, "leuco dye" refers to a dye which, prior to development, is referred to as the leuco form which is substantially colorless or white, and which reacts with another substance upon exposure to heat to form a colored dye. The color-altering phenomenon is typically due to a chemical change, such as through oxidation, resulting from heat exposure.

The term "activator" refers to a composition that is interactive or reactive with leuco dyes upon introduction of heat.

The term "acid-generating source" includes compositions that react under the influence of either heat or IR radiation to provide either acids or radicals which form acids.

As used herein, "developing" or "development" refers to the interaction or reaction of a leuco dye with another agent, such as an activator, to produce a visible composition having a desired color.

As used herein, "absorber" refers generally to an electromagnetic radiation sensitive agent that can generate heat upon exposure to a predetermined frequency of electromagnetic radiation. The predetermined frequency can be different from one absorber composition to the next. When admixed with or in thermal contact with a leuco dye and/or activator, an absorber can be present in sufficient quantity so as to produce heat sufficient to at least partially develop the leuco dye in accordance with embodiments of the present invention.

The term "thermal contact" refers to the spatial relationship between an absorber and a color forming composition. For example, when an absorber is heated by interaction with electromagnetic radiation, the heat generated by the absorber should be sufficient to cause the leuco dye of the color forming composition to darken through reaction with the activator. Thermal contact can include close proximity between an absorber and a leuco dye, which allows for heat transfer from the absorber toward the leuco dye and/or activator. Thermal contact can also include actual contact between an absorber and a leuco dye, such as in immediately adjacent layers, or in an admixture including both constituents.

"Stabilizing agent" refers to compositions that can be used to reduce undesired development of leuco dyes upon exposure to ambient or other light sources.

"Carrier" or "liquid carrier" is defined to include liquid compositions that can be used to carry leuco dyes, activators, stabilizing agents, and/or absorbers to a substrate. Water, surfactants, solvents, cosolvents, and the like can be used in various combinations as the liquid carrier. A combination of leuco dye, activators, acid-generating source, absorber, and stabilizing agent can be within a common liquid carrier, or can be in multiple separate carriers to be applied to a substrate sequentially. The liquid carrier can also carry other additives such as polymers, UV curable materials, and/or colorant in some embodiments.

The term "spin-coatable composition" includes a liquid carrier having various components dissolved or dispersed therein. In some embodiments, the spin-coatable composition can comprise a color forming composition, an absorber, and a stabilizing agent in a common liquid carrier. In other embodiments, fewer components can be present in a liquid carrier forming the spin-coatable composition. Alternatively, multiple liquid carriers can be used to carry the color forming composition, the absorber, and the stabilizing agent in any combination, wherein at least one of the color forming composition, the absorber, and the stabilizing agent is spin-coatable. It is important to note that a spin-coatable composition that lists various components does not require that all components of the composition be independently spin-coatable. In other words, if at least one component of a spin-coatable composition having multiple components is described as spin-coatable, the entire composition is defined as spin-coatable for purposes of the present disclosure. Thus, for example, the color forming composition can be spin-coatable and applied to a substrate and then a stabilizing agent can be formed in a separate layer which can be applied by spraying, screen-printing, or other methods which do not require spin-coatability. When referring to spin-coatable compositions herein, it is to be understood that this designation is provided for exemplary purposes only. Coating compositions can be spin-coatable in one embodiment, or can be configured for other application methods as well.

As used herein, "optical density" refers to the logarithm of the reciprocal of reflectance, where reflectance is the ratio of reflected power to incident power.

It is important to note that, with respect to leuco dyes, activators, acid-generating sources, absorbers, stabilizing agents, and other non-liquid carrier components, the weight percent values are measured relative to a dry basis, thus excluding the liquid carrier. In other words, unless otherwise specified, values of "% by weight" or "weight percent" refer to the compositions that will be present in the color forming composition, excluding the carrier (typically MEK and/or an alcohol). Thus, such values are measured based on the dry weight percent of the coating composition, prior to adding to admixture with the liquid carrier to form a spin-coatable composition. The total dry coating weight can include leuco dye, activator, acid-generating source, absorber, stabilizing agent, binder, plasticizer, and other optional additives. It should be noted that some of the listed components can be undissolved solids, and some components can dissolve, e.g., stabilizing agents, etc., when mixed with typical solvent carriers.

One exception to the above description of weight percent occurs when referring to "solids." The term "solids" refers to the components of a composition that are not dissolved in the liquid carrier. Typically, leuco dyes, activators, acid-generating sources, stabilizing agents, and/or absorbers will remain on a substrate after drying of the liquid carrier, but as these components are typically solubilized in the liquid carrier, they are not included as solids. Additives such as pigments, polymers, plasticizers, and the like can be dispersed in the liquid carrier, rather than dissolved, and make up the solids content. This distinction is useful to understand, as the total amount of solids by weight in the color forming composition (which includes the carrier) has an upper limit in order for the composition to be spin-coatable. In one embodiment, the total percentage of solids in the color forming composition can be less than 10% by weight.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 µm to about 200 µm should be interpreted to include not only the explicitly recited concentration limits of 1 µm to about 200 µm, but also to include individual concentrations such as 2 µm, 3 µm, 4 µm, and sub-ranges such as 10 µm to 50 µm, 20 µm to 100 µm, etc.

Figure 1:
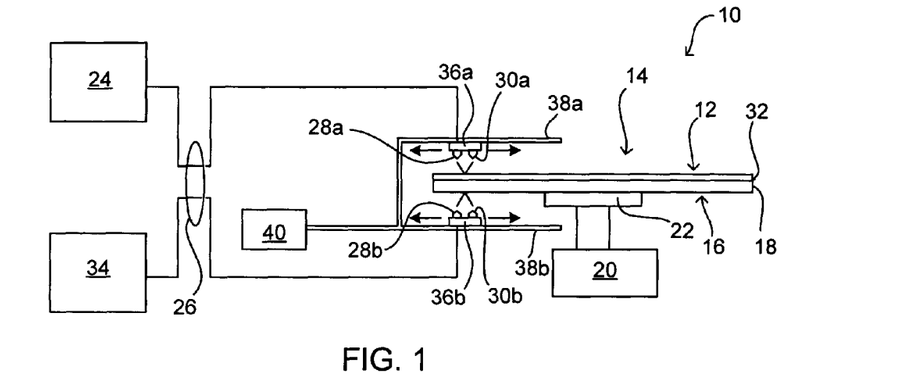
FIG. 1 is a schematic diagram of a system for labeling a substrate in accordance with embodiments of the present invention.

As illustrated in FIG. 1, a system for labeling a substrate having a spin-coatable composition thereon, indicated generally at 10, in accordance with the present invention is shown. In this embodiment, the system can simultaneously write to the image side 12 of an optical disk 14 and collect and/or write data to the data side 16 of the optical disk. The optical disk substrate 18 is shown in a first orientation, with the image side 12 facing in an upward direction. A motor 20 and a support member 22 are present for spinning and supporting the optical disk 14.

In accordance with the present invention, an image is digitally stored on image data source 24. This image information can be generated using any number of commercially available image software programs. The image can then be rasterized or spiralized and delivered to a labeling infrared radiation source via signal processor 26. This process generally involves digitizing image data to correspond to a spiral path that matches the path followed by the infrared radiation source with respect to the image side of the optical disk while spinning. In one embodiment, the labeling infrared radiation source is an emitting device 28a and an optional label detecting device 30a facing the image side 12 of the spinning optical disk 14 having a spin-coatable composition 32 in accordance with the present invention coated thereon. Additionally, an optional second emitting device 28b and a second detecting device 30b face the data side 16 and are configured for simultaneous reading and/or writing operations. The data can be generated, used, and/or stored in data source 34. In one embodiment, data can be written by sending it to the second emitting device 28b via signal processor 26. Each set of emitters and detectors are positioned on a first sled 36a and a second sled 36b, respectively. Additionally, the first sled 36a and the second sled 36b follow a first track 38a and a second track 38b, respectively. In this embodiment, a single solenoid 40 is shown that acts to simultaneously cause both the first sled 36a and the second sled 36b to travel and collect information in unison. However, this is not required.

In an alternative embodiment, each sled can be configured to be independent of the other. In such an embodiment, the use of two solenoids or other mechanical or electrical structures can be implemented for independent function. Additionally, other embodiments are possible such as using a single track and solenoid combination such as those available in common CD-R/CD-RW drives. The same emitter and diode combinations could be used to read and write data and then the disk could be inverted and an image could be developed using the leuco dyes of the present invention.

Figure 2A:
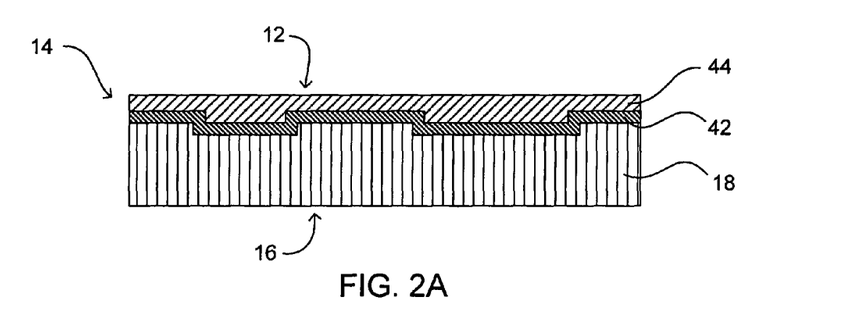
FIGS. 2A, 2B and 2C are cross-sectional views of a portion of an optical disk according to several exemplary embodiments of the present invention.
Figure 2B:
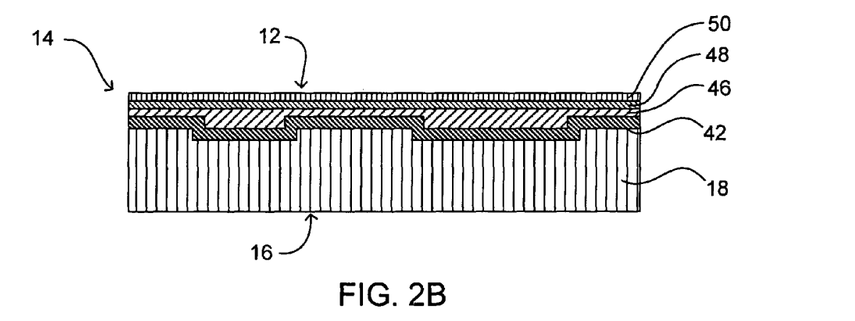
Figure 2C:
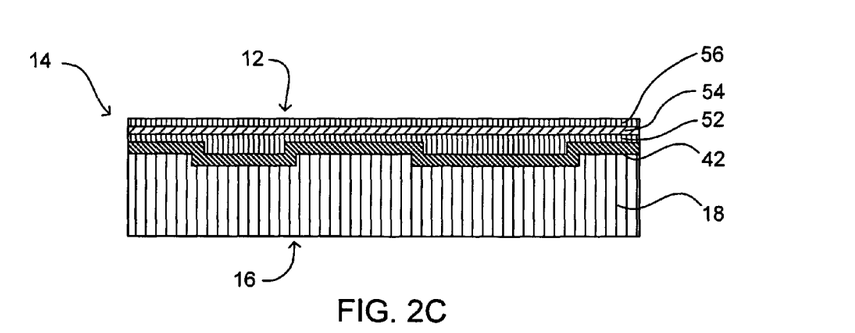

The present invention relates generally to labeling a substrate using specific coating compositions which can optionally be spin-coatable. As illustrated in FIGS. 2A, 2B, and 2C, an optical disk, shown generally at 14, includes a substrate 18 having various coatings is shown. The substrate 18 is generally used for structural support, and the optical disk 14 has a data side 16 and a label side 12. The substrate 18 can be made of any suitable material such as a polycarbonate for optical disks or other polymeric materials. A data layer 42 is generally formed by sputtering or other known processes and can contain any known materials capable of creating, maintaining, and/or mimicking pits and lands corresponding to specific data. Thus, though a single data layer is shown, it is understood that multiple layers can be used, such as for writable and/or rewritable formats. Such materials for use in creating permanent (ROM), writable, or rewritable formats are well known to those skilled in the art. These materials include, but are not limited to, aluminum, cyanine, phthalocyanine, metallized azo dyes, and photosensitive compounds in a polymer binder in a dye layer. For example, rewritable optical disks typically include a quaternary phase-change alloy exhibiting different reflective properties in the amorphous and crystalline states. The data layer can also contain colorants which do not affect the data storage performance of the data layer. The above compositions are readable or writable as to the data side 16 of the optical disk 14.

The coating compositions of the present invention, which can optionally be spin-coatable, can be prepared and applied in a variety of ways to a variety of substrates such as a data readable or writable optical disk. For example, as shown in FIG. 2A, a spin-coatable composition 44 can be prepared that includes a liquid carrier (which will be substantially removed upon drying) that contains, without limitation, a leuco dye, a hexaarylbiimidazole activator, an acid-generating source, an electromagnetic radiation absorber, and a stabilizing agent. The spin-coatable composition includes the liquid carrier, which can act to improve coating performance, but which can be removed upon coating through known liquid removal processes. Typically, at least a portion of the liquid carrier can be driven off or allowed to evaporate after the coating process is complete. The liquid carrier can include, but is not limited to, solvents such as methylethyl ketone, isopropyl alcohol or other alcohols, water, surfactants, and mixtures thereof.

As the spin-coatable composition of the embodiment shown is to provide not only leuco dye and activator function, but is also used to protect the top surface of the disk, various additional components, such as lubricants, surfactants, and materials imparting moisture resistance, can also be added to provide mechanical protection to the color forming composition.

In an alternative embodiment, the electromagnetic radiation absorber can be applied in a separate layer with respect to a color forming layer, e.g., leuco dye, activator, acid-generating composition, wherein the separate layer is placed on the substrate either before or after the color forming composition. FIG. 2B shows a color forming composition layer 46 containing a leuco dye, hexaarylbiimidazole activator, and an acid-generating source, which was applied using a suitable liquid carrier. This color forming composition is formed on the data layer 42, and can cover the entire surface or merely a portion of the optical disk 14. In the embodiment shown in FIG. 2B, an absorber layer 48 can be formed as a separate layer, which covers at least a portion of the optical disk. In one embodiment, in order for the color forming composition to be developed as desired on the optical disk surface, the absorber layer can be formed on at least approximately the same portions of the optical disk as the color forming composition layer. This provides an optical disk having the absorber layer in thermal contact with the color forming composition layer. If the two layers are not in actual contact, but are close enough in proximity for thermal activation of the leuco dye to occur, the layers can also be said to be in thermal contact.

In another aspect of the present invention, the stabilizing agent can be applied in a separate stabilizing agent-containing layer (not shown) from the color forming composition layer and/or absorber layer or admixed therein. For example, the stabilizing agent can be admixed with the color forming composition layer 46 and/or the absorber layer 48. In other words, the stabilizing agent can be present in the color forming composition layer, the absorber layer, or in a third layer such as the protective layer 50. The stabilizing agent can be applied in a variety of layer configurations as long as the stabilizing agent is admixed with or placed in between the color forming composition and any ambient light. In another embodiment, the stabilizing agent and color forming composition layers can be separated by a physical barrier such as a thin transparent film or other layer (not shown).

It has been found that applying the stabilizing agents of the present invention in a separate layer between the color forming composition layer 46 and any ambient light, improved room light stability can be realized, although admixing the stabilizing agents with the color forming composition also provides acceptable stability results. An optional protective layer 50 can be formed to add mechanical protection to the color forming composition layer and absorber layer 48. The protective layer can also include the stabilizing agent which acts to protect and stabilize the leuco dye of the color forming layer from ambient light. The protective layer may be substantially transparent or translucent such that sufficient infrared electromagnetic radiation is allowed to pass therethrough, allowing for development of the leuco dye of the color forming composition, once dried on a substrate.

In yet another alternative embodiment of the present invention, FIG. 2C depicts an optical disk 14 having a substrate 18, a data layer 42, and a first protective layer 52. A coating composition layer 54 can be prepared to include: a leuco dye, a hexaarylbiimidazole activator, an acid-generating source, an electromagnetic radiation absorber, and a stabilizing agent, applied using a carrier to form a spin-coatable composition, as discussed above. Alternatively, the absorber, stabilizing agent, and color forming composition (leuco dye, activator, and/or acid-generating source) can also be applied in separate layers, each with separate liquid carriers. The first protective coating layer 52 protects the data layer 42, as is typical for writable and rewritable optical disks currently being sold commercially. A second protective coating layer 56 protects the coating composition layer(s) 54. Such protective coatings can be coatings including lacquers, UV coats, or polymeric films. Alternatively, the stabilizing agent can be present in the second protective coating 56.

Color Forming Composition

With respect to each of the embodiments enumerated in the Figures, as well as with respect to equivalent embodiments, a color forming composition can be applied as its own layer, or can be applied with an absorber and/or stabilizer. The color forming composition can include a leuco dye, an activator, and an acid-generating source.

Leuco dyes suitable for use in the present invention are members selected from the group consisting of amino-triarylmethanes, aminoxanthenes, aminothioxanthenes, amino-9, 10-dihydro-acridines, aminophenoxazines, aminophenothiazines, aminodihydro-phenazines, aminohydrocinnamic acids and corresponding esters, 2(p-hydroxyphenyl)-4,5-diphenylimidazoles, indanones, and mixtures thereof. In one aspect of the present invention, the leuco dye is an aminotriarylmethane such as Leuco Crystal Violet having the structure:

Generally, leuco dyes are substantially colorless, and upon removal of one or two hydrogen atoms, convert to a colored dye. A wide variety of specific leuco dyes within the above mentioned categories may be suitable for use in the present invention and are known to those skilled in the art. A more detailed discussion of these types of leuco dyes may be found in U.S. Pat. Nos. 3,658,543 and 6,251,571, each of which are hereby incorporated by reference in their respective entireties.

Upon heat-induced oxidation, protonation, ring-opening, or the like, in the presence of an activator, the above-recited leuco dyes can form dyes having a variety of optical characteristics. Although a wide range of compositions are suitable for use in the present invention, the coating composition can contain at least about 3% by weight of leuco dye, and in more detail, can be present at from about 4% and about 20% by weight. This weight ratio range assumes that the color forming composition (which includes the leuco dye), absorber, and stabilizing agent are in a common coating layer, which can be optionally spin-coatable. However, one skilled in the art would recognize that this ratio can be altered if the color forming composition is applied as a separate layer with respect to the absorber and/or the stabilizer. These ranges are only exemplary and other weight ranges can be used depending on the desired image characteristics and other considerations.

As stated, interaction between a leuco dye and an activator causes a chemical change in the leuco dye, thereby altering the color of the leuco dye from substantially white or colorless to substantially colored in appearance. The colored appearance can be generally a dark color such as black or deep colors having a high optical density. Generally, the chemical change in the leuco dye occurs upon application of a predetermined amount of heat. Activators suitable for use in the present invention are generally known as hexaarylbiimidazoles (HABIs) and can be chosen by those skilled in the art. Several non-limiting examples of suitable HABI activators include 2,2'-bis(2-ethoxyphenyl)-4,4',5,5'-tetraphenyl-2',1, 1'-bi-1H-imidazole (o-EtO-HABI); 2-(o-chlorophenyl)-4,5-bis(m-methoxyphenyl)imidazole dimer (CMD-HABI); 2,2'-bis(2-chlorophenyl)-4,4',5,5'-tetraphenyl-1,1'-bi-1H-imidazole (o-Cl-HABI); 2-(2-methylphenyl)-2'-[2-(2-methylphenyl)-4,5-diphenyl-2H-imidazol-2-yl]-4,5-diphenyl-1H-imidazole (o-Me-HABI); 2,2',5-tris(2-chlorophenyl)-4-(3,4-dimethoxyphenyl)-4',5'-diphenylbiimidazole (TCDM-HABI); 2,2',4,4'-tetra(2-chlorophenyl)-5,5'-bis(3,4-dimethoxyphenyl)-2', 1'-bi-1'-1H-imidazole (TCTM-HABI); 2,2'-di(2'-naphthalenyl)-4,4', 5,5'-tetraphenyl-1,1'-bi-1H-imidazole (N-HABI); 2,2'-bis(1-naphthalenyl)-4,4'-bis(2-chlorophenyl-5,5'-bis(3-methoxyphenyl)-2',1'-bi-1H-imidazole (MCN-HABI); and 2,2'-bis(1-naphthalenyl)-4,4',5,5'-tetrakis(3-methoxyphenyl)-2,1'-bi-1H-imidazole (MN-HABI), and combinations thereof. In one aspect of the present invention, the HABI activator is o-EtO-HABI. Other HABI activators can be used in the present invention and are known to those skilled in the art. The coating compositions of the present invention can contain from about 6% to about 45% by weight of HABI activator in one embodiment. In another embodiment, the HABI activator can be present from about 20% and about 40% by weight. In a further detailed aspect, the HABI activator can be present at from about 25% to about 38% by weight. However, if the coating composition is applied in layers, which layers can be individually spin-coatable, including a layer wherein the color forming composition is not applied in a common liquid carrier as the absorber and/or the stabilizing agent, these range values can be altered as would be apparent to one skilled in the art.

In another aspect of the present invention, the color forming composition can also include an acid-generating compound. The acid-generating compound can be configured to react under the influence of either heat or IR radiation to provide either acids or radicals which form acids. The acid-generating compounds suitable for use in the present invention include halogen sources such as, but not limited to, tribromomethyl phenyl sulfone, 1,2-dibromotetrachloroethane, tristrichloromethyltriazine, dibromobenzylidene acetophenone, and mixtures thereof. In one aspect of the present invention, the halogen source can be tribromomethyl phenyl sulfone.

Electromagnetic Radiation Absorber

An electromagnetic radiation absorber can be part of the coating composition, and can be applied as a separate layer which can be optionally spin-coatable, or can be applied in a common liquid carrier with the color forming composition and/or the stabilizing agent. The absorber can act as an energy antenna, providing heat to surrounding areas upon interaction with an energy source. As a predetermined amount of heat is provided by the electromagnetic radiation absorber, matching of the electromagnetic radiation frequency and intensity to the absorber used can be carried out to optimize the system. The absorber can be present in the spin-coatable composition in an amount of between about 0.001% and about 10% by weight, and typically, between about 1% and about 5% by weight, although other weight ranges may be desirable depending on the activity of the particular absorber. As stated previously, these weight percentages represent an amount of absorber that can be present in a single layer spin-coatable composition. These weight percentages can be altered in other embodiments, such as when the absorber is applied separately with respect to one or more other layers.

Various absorbers will act as an antenna to absorb electromagnetic radiation of specific frequencies and ranges. Of particular interest is laser light having infrared frequencies from about 760 nm to about 800 nm. Therefore, the present invention can provide color forming compositions optimized for use in devices that emit frequencies within this range. Typical commercial IR lasers found in common CD and DVD equipment are at a frequency of about 780 nm, and thus, the compositions of the present invention can be used in equipment that is already commonly on the market.

The absorber can be configured to be in a heat-conductive relationship with the leuco dyes of the present invention. For example, the absorber can be placed in the same layer as the leuco dye as part of an admixture, or can be in a separate layer. Thus, the absorber can be admixed with or in thermal contact with the color forming composition. In one aspect of the present invention, the absorber can be applied to the substrate in a separate adjacent layer prior to or after applying the color forming composition as a layer. In one embodiment, consideration can also be given to choosing the absorber such that any light absorbed in the visible range does not adversely affect the graphic display or appearance of undeveloped leuco dye.

Although an inorganic compound can be used, the absorber typically can be an organic compound, such as, but is not limited to polymethyl indoliums, metal complex IR dyes, indocyanine green, heterocyclic compounds and combinations thereof. Suitable polymethyl indolium compounds available from Aldrich Chemical Company include 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate; 2-[2-[2-Chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium chloride; 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propylindolium iodide; 2-[2-[2-chloro-3-[(1,3-dihydro-1,3,3-trimethyl-2H-indol-2-ylidene) ethylidene]-1-cyclohexen-1-yl]ethenyl]-1,3,3-trimethylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium perchlorate; 2-[2-[3-[(1,3-dihydro-3,3-dimethyl-1-propyl-2H-indol-2-ylidene)ethylidene]-2-(phenylthio)-1-cyclohexen-1-yl]ethenyl]-3,3-dimethyl-1-propylindolium perchlorate; and mixtures thereof. In one aspect of the present invention, the IR absorber is 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate. Other suitable absorbers can also be used in the present invention and are known to those skilled in the art and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both incorporated herein by reference. Although, the specific activators and absorbers discussed herein are separate compounds, such activity can also be provided by constituent groups of a leuco dye which incorporates the activation and/or radiation absorbing action within the leuco dye molecule.

Stabilizing Agent

A stabilizing agent can also be included in the coating compositions of the present invention which can be optionally spin-coatable. In accordance with one aspect of the present invention, the stabilizing agent can be included in the color forming composition. In another aspect, the stabilizing agent can be present in a separate layer, and applied to the substrate after the color forming composition. The present invention makes use of a stabilizing agent which comprises a diarylguanidine dye salt to improve ambient light stability. Suitable diarylguanidine dye salts include salts of yellow, brown, and orange dyes having acid groups and a diarylguanidine such as diphenylguanidines, di-o-tolylguanidines, dixylylguanidines, and di-o-oxylguanidines. In one embodiment, the stabilizing agent is an admixture of a salt of metanil yellow or tartrazine, and di-o-tolyl-phenyl guanidine. The structure of both compositions of the admixture are shown below.

The di-o-tolyl-pne hl guanidine yellow dye not only significantly increased room light stability, but can provide a good "background" color which was not excessively dark (though the di-o-tolyl-phenyl guanidine yellow dye is not technically present as a background, as it is either admixed within the leuco dye layer, or is present as part of a layer coated atop the leuco dye layer). Other suitable diarylguanidine dye salts includes the commercially available LUXOL dyes such as LUXOL Fast Brown K/G, LUXOL FAST YELLOW T, LUXOL Fast Orange GS, other LUXOL dyes, and similar compounds. Other colored dyes such as LUXOL Fast Red, Black, Blue and the like can also be used, however such darker dyes generally present a low contrast with the developed leuco dye. In one embodiment, the stabilizing agent can be mixed with a binder such as a cellulosic ester binder to form an overcoat composition. This overcoat composition can be applied to a suitable substrate subsequent to the color forming composition layer.

The stabilizing agent can be present in the spin-coatable composition at from about 5% by weight to about 20% by weight, and in one aspect from about 7% to about 15% by weight, such as about 10% by weight. Again, these weight ratios assume that the stabilizing agent is present with the color forming composition and the absorber in a common layer. One skilled in the art would recognize that, if applied as a separate layer, these ranges could be altered. For example, an overcoat layer can contain from about 10% to about 20% by weight stabilizing agent.

In a more detailed aspect of the present invention, the stabilizing agent can further include a polyhydroxybenzophenone, hydroxylamine, triarylimidazole, hydroxyphenylbenzotriazole, and mixtures thereof. In one aspect of the present invention the stabilizing agent further comprises 2,2',4,4'-tetrahydroxy benzophenone. In another aspect, the stabilizer further comprises a dibenzyl-hydroxylamine. Such additional stabilizers can be present up to about 20% by weight, independent of the above diarylguanidine dye salts. However, the total weight percent of stabilizers should generally be maintained below about 30% by weight. If present in a separate layer, these weight percentages can be altered.

Electromagnetic Radiation Application for Development

The conditions under which the coating compositions, particularly the color forming compositions, of the present invention are developed can be varied. For example, one can vary the electromagnetic radiation frequency, heat flux, and exposure time. Variables such as spot size and laser power will also affect any particular system design and can be chosen based on the desired results. With these variables, the infrared radiation source can direct infrared radiation to the color forming composition in accordance with the image data source and information received from the signal processor. Further, leuco dye and/or activator concentration and proximity to one another can also be varied. Typically, the activator and the leuco dye are present in a common layer, and thus, concentration ratios can be considered for a desired affect. However, if the color forming composition comprises multiple layers itself, proximity can be considered.

The leuco dyes of the coating compositions can be developed using lasers having from about 15 to 100 mW power usage, although lasers having a power outside this range can also be used. Typically, lasers having from about 30 mW to about 50 mW are readily commercially available. The spot size can be determined by considering the electromagnetic radiation source, and can range from about 1 to about 200 μm, though smaller or larger sizes can also be used. In one embodiment, a radiation spot size of between about 10 and about 60 μm can also be utilized.

Heat flux is a variable that can be altered as well, and can be from about 0.05 to 1.0 J/cm$^2$ in one embodiment, and from about 0.05 to 0.4 J/cm$^2$ in a second embodiment. Heat flux in these ranges allow for development of leuco dyes in less than about 100 microsec per dot in some embodiments, and less than about 35 and 20 microsec per dot in other embodiments. To illustrate an example where these variables can be brought together in a single embodiment, a standard CD image surface coated with a spin-coatable composition including a color forming composition, an activator, and a stabilizer can be developed using a spot size of 20 by 50 μm, a 45 mW laser, and 20 microsec exposure per dot in about 5 minutes. The images produced in accordance with the present invention can have a high optical density of about 1.1 OD or greater. Those skilled in the art can adjust these variables to achieve a variety of resolutions and developing times.

Other Optional Ingredients

There are many optional ingredients that can be present in the spin-coatable compositions of the present invention. For example, a binder can also be included in the compositions of the present invention, either in single layer or multiple layer embodiments. Suitable binders are known to those skilled in the art and can include, but are not limited to, polymeric materials such as polyacrylate from monomers and oligomers, polyvinyl alcohols, polyvinyl pyrrolidines, polyethylenes, polyphenols or polyphenolic esters, polyurethanes, acrylic polymers, and mixtures thereof. In order to provide desirable color forming properties, various factors such as viscosity and solids content can be considered. The spin-coatable compositions of the present invention can have less than about 10% by weight of solids, which typically provides good coating properties. For example, in one aspect, the solids content of the spin-coatable composition can be about 7% by weight.

It can be sometimes desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety. If the leuco dye, activator, acid-generating source, absorber, and/or stabilizing agent are applied in a common liquid carrier, the plasticizer and binder can be included in the carrier as well. If the leuco dye, activator, acid-generating source, stabilizing agent, and/or absorber are applied in multiple layers, the plasticizer and binder can be included in from any one to all of individual liquid carriers.

Other variations can also be implemented, including the adding of a non-leuco colorant to impart additional desired color to the image. For example, the use of an opacifier pigment or other non-leuco colorant can be used to provide background color to the optical disk. The non-leuco colorants can be added to the coating composition (which can include a color forming composition layer, an activator layer, and stabilizing agent layer, or can be an admixture of the three layers in one or two layers), or the protective layer(s), as long as the development of the leuco dye is not prevented from at least some development due to the presence of the optional colorant. In another embodiment, portions of the leuco dye can then be developed producing an image with a colored background. Examples of opacifiers include calcium carbonate, titanium dioxide, and other known opacifiers. Additionally, examples of other non-leuco colorants include dyes or other pigments. In other words, if a colored background is desired that will remain independent of leuco dye development, an opacifier pigment, other pigment, and/or dye can be admixed in the carrier to impart the desired color.

In preparing the color forming composition, such the ingredients can be prepared in solution which is substantially transparent or translucent. Any suitable liquid carrier, such as an alcohol or surfactant, can be used which is compatible with a particular leuco dye (and other ingredients) chosen for use. When the color forming composition is prepared in a solution form, it may be desirable to underprint a colored coating over at least a portion of the substrate beneath the leuco dye solution. The optional colored coating produces a background color that is visible underneath the solution layer. This colored coating can contain various non-leuco colorants such as other pigments and/or dyes. Alternatively, a non-leuco colorant may be added to the data layer to produce the desired background color. The activator can be admixed within the solution or coated onto the substrate either before or after the solution is coated thereon. If a background color is preprinted, such coatings and compositions can be applied to the substrate using any of a variety of known techniques such as screen-printing, spin coating, sputtering, or spray coating. Each coating may be applied and then dried sequentially. In addition, such colored coatings may be applied over the color forming compositions of the present invention. It has been found that improved ambient light stability is achieved when a colored overcoat is applied to the color forming compositions of the present invention.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

About 148 g of butanone-2 (MEK) was measured into a brown bottle equipped with a magnetic stirrer. Components 1-5 shown in Table 1 were added to the MEK carrier and stirred overnight. Components 6-8 were mixed into 10 g of propanol-2 and then combined with the MEK preparation. In this example, the MEK and propanol-2 make up the carrier, and is thus, not included in the weight percent data.

TABLE 1

| Component | Quantity | Dry wt % |
|---|---|---|
| 1) EAB-381-20 | 1.257 g | 31.1 |
| 2) MERPOL 2660 | 0.595 g | 14.8 |
| 3) Dibenzylhydroxylamine | 0.035 g | 0.9 |
| 4) o-EtO-HABI | 1.278 g | 31.8 |
| 5) Tribromomethyl-phenylsulfone | 0.213 g | 5.3 |
| 6) Leuco Crystal Violet | 0.268 g | 6.7 |
| 7) LUXOL Fast Yellow T | 0.300 g | 7.5 |
| 8) IR-797 Perchlorate | 0.077 g | 1.9 |
| Total | 4.023 g | 100 |

The solution prepared was used to coat a variety of surfaces, including optical disks. Upon exposure to IR light at 780 nm and 48 mW for 20 microseconds, a purplish black image was formed having extended room light stability.

Example 2

About 148 g of MEK is measured into a brown bottle equipped with a magnetic stirrer. Components 1-5 shown in Table 2 were added to the MEK carrier and stirred overnight. Components 6-8 were mixed into 10 g of propanol-2 and then combined with the MEK preparation. In this example, the MEK and propanol-2 make up the carrier, and is thus, not included in the weight percent data.

TABLE 2

| Component | Quantity | Dry wt % |
|---|---|---|
| 1) EAB-381-20 | 1.257 g | 30.5 |
| 2) MERPOL 2660 | 0.595 g | 14.5 |
| 3) Dibenzylhydroxylamine | 0.035 g | 0.8 |
| 4) o-EtO-HABI | 1.278 g | 31.1 |
| 5) Tribromomethyl-phenylsulfone | 0.213 g | 5.2 |
| 6) Bis(4-diethylamino-o-tolyl)-(m,p-dimethoxy-phenyl)methane | 0.360 g | 8.7 |
| 7) LUXOL Fast Yellow T | 0.300 g | 7.3 |
| 8) IR-797 Perchlorate | 0.077 g | 1.9 |
| Total | 4.115 g | 100 |

This solution was used to coat a variety of surfaces, including optical disks. Upon exposure to IR light at 780 nm and 48 mW for 20 microseconds, a more neutral shade image was formed having extended room light stability.

Example 3

About 194 g of MEK and 27 g of propanol-2 were measured into an amber bottle. The components listed in Table 3 were then added to the MEK/propanol-2 carrier in the amounts shown, and the composition was stirred overnight in low light conditions.

TABLE 3

| Component | Quantity | Dry wt % |
|---|---|---|
| 1) EAB-381-20 | 4.945 g | 33.6 |
| 2) IGEPAL CO-210 | 0.928 g | 6.3 |
| 3) Dibenzylhydroxylamine | 0.214 g | 1.4 |
| 4) o-EtO-HABI | 5.593 g | 38.0 |
| 5) Tribromomethyl-phenylsulfone | 1.179 g | 8.0 |
| 6) Leuco Crystal Violet | 1.179 g | 8.0 |
| 7) IR-797 Perchlorate | 0.392 g | 2.7 |
| Total | 14.730 g | 100 |

The prepared leuco dye-containing solution of Table 3 was spin coated onto an optical disk. The solution was then allowed to dry to substantially remove the MEK/propanol-2 carrier. Subsequently, 15 g of an 11.5% solution of EAB-381-20 in MEK containing 60 mg of dissolved LUXOL Fast Yellow T was spin coated onto the color forming composition layer. Upon exposure to IR light at 780 nm and 48 mW for 20 microseconds, a dark purple image was formed having extended room light stability.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A coating composition, comprising:
   a) a color forming composition including,
      i) a leuco dye in a substantially colorless form,
      ii) a hexaarylbiimidazole activator, and
      iii) an acid-generating source;
   b) an electromagnetic radiation absorber admixed with or in thermal contact with the color forming composition; and
   c) a stabilizing agent configured for protecting the leuco dye upon exposure to ambient light, said stabilizing agent comprising a diarylguanidine dye salt,
   said color forming composition and said electromagnetic radiation absorber being optimized for development of the leuco dye into colored dye form using electromagnetic radiation having a frequency of between about 760 nm and 800 nm.

2. The composition of claim 1, wherein the color forming composition is optimized for development using electromagnetic radiation having a frequency of about 780 nm.

3. The composition of claim 1, wherein the radiation is at a power level from about 30 mW and about 50 mW.

4. The composition of claim 1, wherein the color forming composition is developed in a time of less than about 35 microseconds per dot.

5. The composition of claim 1, wherein the radiation is supplied for less than about 20 microseconds per dot.

6. The composition of claim 1, wherein the stabilizing agent is a yellow diarylguanidine salt.

7. The composition of claim 1, wherein the stabilizing agent further comprises a second component selected from the group consisting of polyhydroxybenzophenones, hydroxylamines, triarylimidazoles, hydroxyphenylbenzotriazoles, and mixtures thereof.

8. The composition of claim 7, wherein the second component comprises 2,2',4,4'-tetrahydroxybenzophenone.

9. The composition of claim 1, wherein the radiation absorber is a polymethyl indolium.

10. The composition of claim 9, wherein the radiation absorber is 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate.

11. The composition of claim 1, wherein the leuco dye is selected from the group consisting of aminotriarylmethanes, aminoxanthenes, aminothioxanthenes, amino-9,10-dihydroacridines, aminophenoxazines, aminophenothiazines, aminodihydrophenazines, aminohydrocinnamic acids and corresponding esters, 2(p-hydroxyphenyl)-4,5-diphenylimidazoles, indanones, and mixtures thereof.

12. The composition of claim 11, wherein the leuco dye is an aminotriarylmethane.

13. The composition of claim 12, wherein the leuco dye is leuco crystal violet.

14. The composition of claim 1, wherein the activator is a member selected from the group consisting of 2,2'-bis(2-ethoxyphenyl)-4,4',5,5'-tetraphenyl-2',1,1'-bi-1H -imidazole; 2-(o-chlorophenyl)4,5-bis(m-methoxyphenyl)imidazole dimer; 2,2'-bis(2-chlorophenyl)-4,4',5,5'-tetraphenyl-1, 1'-bi-1H-imidazole; 2-(2-methylphenyl)-2'-[2-(2-methylphenyl)4,5-diphenyl-2H-imidazol-2-yl]-4,5-diphenyl-1H-imidazole; 2,2',5-tris(2-chlorophenyl)-4-(3,4-dimethoxyphenyl)-4',5'-diphenylbiimidazole; 2,2',4,4'-tetra (2-chlorophenyl)-5,5'-bis(3,4-dimethoxyphenyl)-2',1'-bi-1'-1H-imidazole; 2,2'-di(2'-naphthalenyl)-4,4',5,5'-tetraphenyl-1,1'-bi-1H-imidazole; 2,2'-bis(1-naphthalenyl)-4,4'-bis(2-chlorophenyl)-5,5'-bis(3-methoxyphenyl)-2',1'-bi-1H-imidazole; 2,2'-bis(1-naphthalenyl)-4,4',5,5'-tetrakis(3-methoxyphenyl)-2',1'-bi-1H-imidazole; and mixtures thereof.

15. The composition of claim 14, wherein the activator is 2,2'-bis(2-ethoxyphenyl)-4,4',5,5'-tetraphenyl-2',1,1'-bi-1H-imidazole.

16. The composition of claim 1, wherein the coating composition further includes a binder.

17. The composition of claim 16, wherein the binder is a cellulosic ester.

18. The composition of claim 16, wherein the coating composition further includes a plasticizer at a plasticizer to binder weight ratio from 1:20 to 5:3.

19. The composition of claim 18, wherein the plasticizer is an o-phenyl phenol ethylene oxide adduct.

20. The composition of claim 1, wherein the acid-generating source is a halogen source being a member selected from the group consisting of tribromomethyl phenyl sulfone, 1,2-dibromotetrachloroethane, tristrichloromethyltriazine, dibromobenzylidene acetophenone, and mixtures thereof.

21. The composition of claim 20, wherein the halogen source is tribromomethyl phenyl sulfone.

22. The composition of claim 1, wherein at least one of the color forming composition, the electromagnetic radiation absorber, and the stabilizing agent is present in a spin-coatable composition.

23. The composition of claim 22, wherein the spin-coatable composition further comprises a liquid carrier, wherein the undissolved solids content is less than 10% by weight.

24. The composition of claim 23, wherein the undissolved solids content is about 7% by weight.

25. The composition of claim 23, wherein the color forming composition, electromagnetic radiation absorber, and stabilizing agent are admixed together in the liquid carrier to form the spin-coatable composition.

26. The composition of claim 1 applied to a substrate in at least one layer.

27. The composition of claim 26, wherein the stabilizing agent is included in a first layer, and wherein the color forming composition is included in a second layer, such that the second layer is between the first layer and the substrate.

28. The composition of claim 26, wherein the absorber is admixed with the color forming composition to form a common layer, said absorber being thermally active at the frequency of the electromagnetic radiation.

29. The composition of claim 26, wherein the electromagnetic radiation absorber is included in a first layer, and wherein the color forming composition is included in a second layer, said second layer being configured with respect to the first layer such that the absorber is in thermal contact with the color forming composition upon activation by the frequency of the electromagnetic radiation.

30. The composition of claim 26, wherein the substrate is an optical disk.

31. A spin-coatable composition, comprising:
   a) a color forming composition including
      i) an aminotriarylmethane leuco dye in a substantially colorless form,
      ii) a hexaarylbiimidazole activator, and
      iii) a halogen source;

b) an electromagnetic radiation absorber admixed with or in thermal contact with the color forming composition, wherein the radiation absorber is a polymethyl indolium; and c) a stabilizing agent configured for protecting the leuco dye upon exposure to ambient light, said stabilizing agent being a yellow diarylguanidine dye salt, said color forming composition being optimized for development of the aminotriarylmethane leuco dye into a colored dye form using electromagnetic radiation having a frequency of about 780 nm, and wherein at least one of the color forming composition, the electromagnetic radiation absorber, and the stabilizing agent is spin-coatable.

* * * * *

UNITED STATES PATENT AND TRADEMARK OFFICE
CERTIFICATE OF CORRECTION

| | | |
|---|---|---|
| PATENT NO. | : 7,462,443 B2 | Page 1 of 1 |
| APPLICATION NO. | : 10/655708 | |
| DATED | : December 9, 2008 | |
| INVENTOR(S) | : Randall Orson Willard et al. | |

It is certified that error appears in the above-identified patent and that said Letters Patent is hereby corrected as shown below:

In column 11, line 24, after "common" delete "10".

In column 15, line 21, in Claim 1, after "into" insert -- a --.

Signed and Sealed this

Eighteenth Day of August, 2009

David J. Kappos
*Director of the United States Patent and Trademark Office*